US006345419B1

(12) United States Patent
Traktovenko

(10) Patent No.: US 6,345,419 B1
(45) Date of Patent: Feb. 12, 2002

(54) TERMINATION FOR FLAT FLEXIBLE TENSION MEMBER

(75) Inventor: Boris Traktovenko, Avon, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/487,915

(22) Filed: Jan. 19, 2000

(51) Int. Cl.[7] .............................................. F16G 11/04

(52) U.S. Cl. .................................................... 24/136 R

(58) Field of Search .......................... 24/115 M, 135 A, 24/136 K, 136 L, 135 R, 136 R; 187/264, 20, 22, 23, 26, 254, 266, 349, 350, 351, 373, 404, 411, 412, 414; 254/335, 900; 403/16, 210, 211, 213, 314, 374.1; 188/188

(56) References Cited

U.S. PATENT DOCUMENTS

| | | | | | |
|---|---|---|---|---|---|
| 926,926 | A | * | 7/1909 | Dawson | 403/211 |
| 975,790 | A | | 11/1910 | Pearson | 187/254 |
| 1,011,423 | A | | 12/1911 | Gale, Sr. | 187/256 |
| 1,035,230 | A | | 8/1912 | Pearson | 187/254 |
| 1,164,115 | A | | 12/1915 | Pearson | 187/254 |
| 1,380,800 | A | * | 6/1921 | Haworth | 24/136 K X |
| 2,130,040 | A | * | 9/1938 | Siler | 24/136 K X |
| 2,482,231 | A | * | 9/1949 | White | 24/136 K X |
| 2,540,887 | A | * | 2/1951 | Hyatt | 24/115 M X |
| 2,977,654 | A | * | 4/1961 | Page | 403/211 |
| 4,536,921 | A | * | 8/1985 | Brendel et al. | 24/136 K X |
| 4,602,891 | A | * | 7/1986 | McBride | 24/136 K X |
| 4,887,337 | A | * | 12/1989 | Bateman | 24/136 R |
| 5,112,933 | A | | 5/1992 | O'Donnell et al. | 528/61 |
| 5,199,137 | A | * | 4/1993 | Edwards | 24/136 K |

FOREIGN PATENT DOCUMENTS

| | | |
|---|---|---|
| DE | 2333120 | 1/1975 |
| DE | 3623407 | 7/1986 |
| FR | 2293392 | 12/1974 |
| GB | 1362514 | 8/1974 |
| GB | 1401197 | 7/1975 |
| JP | 63092412 | 4/1988 |
| JP | 01137383 | 6/1989 |
| JP | 03192398 | 8/1991 |
| RU | 1216120 A | 7/1986 |
| WO | WO9829326 | 7/1998 |
| WO | WO9829327 | 7/1998 |

* cited by examiner

*Primary Examiner*—Anthony Knight
*Assistant Examiner*—Ruth C. Rodriguez

(57) ABSTRACT

Several embodiments of terminations for flat flexible tension members include wedge type terminations, pinching terminations, and frictional terminations and combinations of the above.

13 Claims, 5 Drawing Sheets

FIG.2
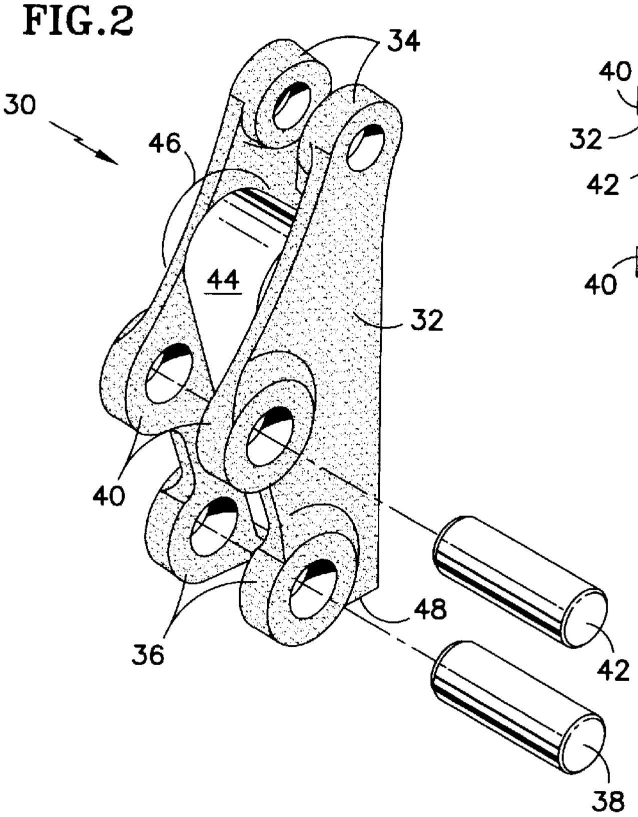
FIG.4
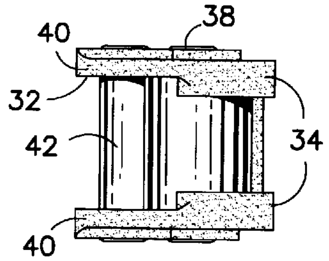
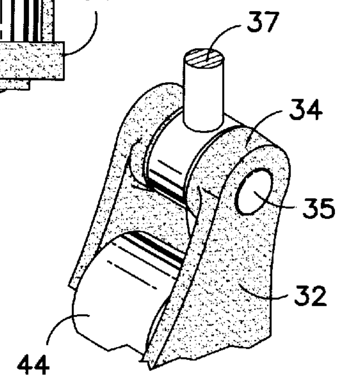
FIG.5
FIG.3
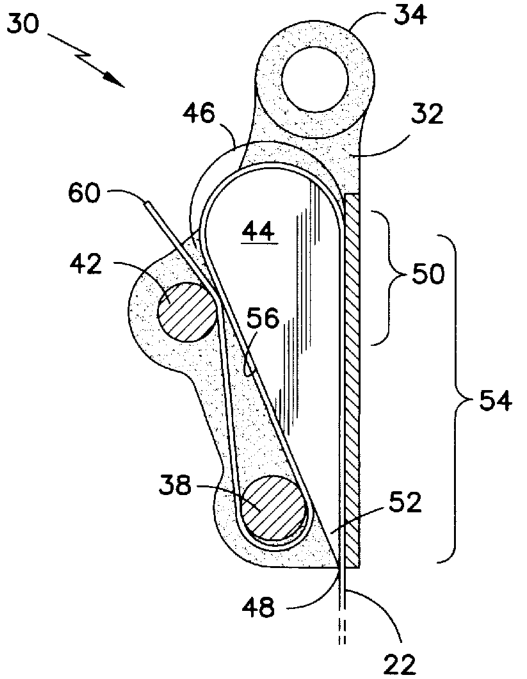
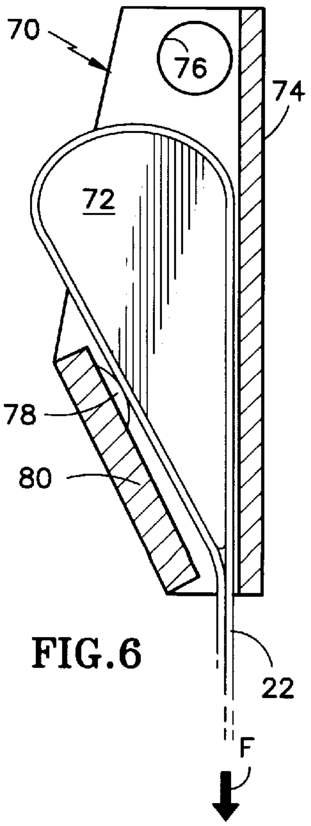
FIG.6

FIG.10
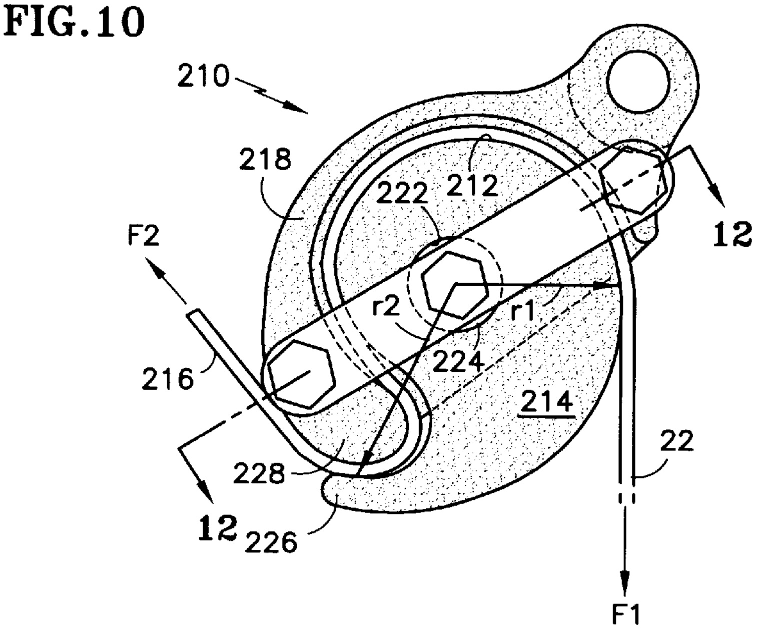
FIG.11
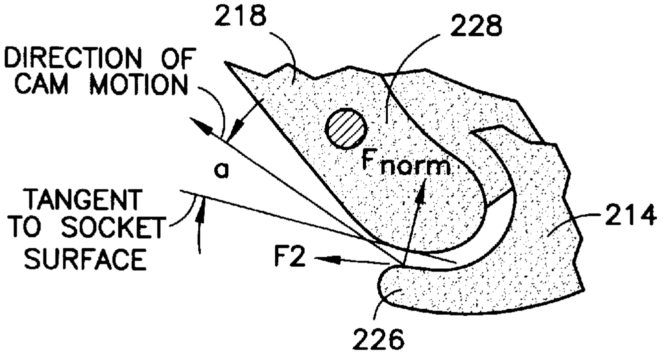
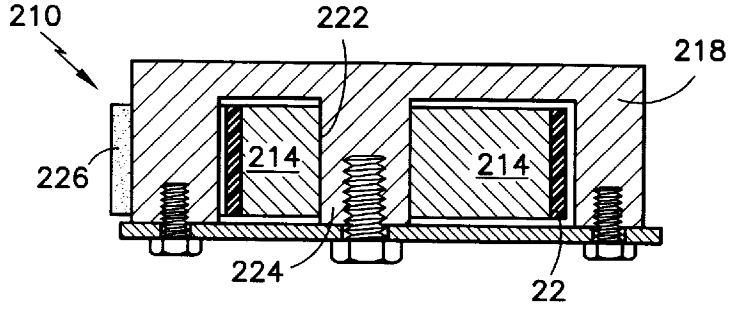
FIG.12

TERMINATION FOR FLAT FLEXIBLE TENSION MEMBER

TECHMICAL FIELD

The present invention relates to elevator systems. More particularly, the invention relates to various embodiments for terminating a flexible flat tension member.

BACKGROUND OF THE INVENTION

A conventional traction elevator system includes a car, a counterweight, two or more tension members interconnecting the car and counterweights; terminations for each end of the tension members at the connection points with the car and counterweights, a traction sheave to move the tension members and a machine to rotate the traction sheave. A second type of conventional elevator roping system is known to the art as a 2-to-1 roping system where the rope is terminated to a dead hitch and not the counterweight and car. The tension members have traditionally been formed of laid or twisted steel wire which are easily and reliably terminated by means such as a compression terminations and potted terminations.

Compression-type terminations for steel tension members of larger diameters (conventional steel elevator tension members) are extremely effective and reliable. The range of pressures placed on such terminations is reasonably broad without adverse consequence. Providing that the pressure applied is somewhere reasonably above the threshold pressure for retaining the tension members, the termination is effective.

Clamp-type and existing wedge-type and termination devices have been employed for flexible flat tension members and are adept at providing reliable terminations. They are, however, expensive and can be difficult to disassemble, after weighting. The expense related to clamp-type terminations is due to the number of individual components needed as well as the time for installing the same. Existing wedge-type terminations, while being less expensive to manufacture than clamp-type terminations and less time consuming to install, they are still more expensive than is desirable in the industry due to the need for a texturing of the surface to prevent the coefficient of friction on the wedge from dropping below the number required to prevent movement of the tension member therethrough for example if the wedge becomes unintentionally lubricated. Moreover, existing wedge-type terminations when used with flat tension members tend to be difficult to disassemble for maintenance after a load has been placed on them. Thus, the art is still in need of a termination device that reaches an advantageous price point, is easy and timely to assemble and is easy and timely to disassemble.

SUMMARY OF THE INVENTION

The above-identified drawbacks of the prior art are overcome or alleviated by the termination device of the invention. The termination device of the invention is a single wedge device wherein the wedge is maintained in position (tension wrapped therearound) by a load side of a socket on one side and on the other side by two pins, one being fixed and one being removable which pins are mounted on said socket. The device operates similarly to other single wedge termination devices in that the wedge is drawn downwardly into a socket to provide compressive force on a tension member threaded between the socket and the wedge. The device of the invention differs, however, in significant ways in that it reliably terminates a tension member while using less material and less height, pinches the flat rope in a desirable location (stronger holding capacity) and additionally facilitates easy assembly and disassembly of the device. While prior art wedge devices are easy to assemble, they are difficult to disassemble as noted above. By employing the removable pin arrangement for the device of the invention, the wedge remains easily removable without regard for creep of the tension member jacket over time. The removable pin is positioned so that when installed it provides excellent support for the wedge and when it is disengaged, allows the wedge to be easily removed from the socket.

In another embodiment of the invention the "pinching" effect on the tension member is provided by a protrusion or bump on the unloaded side of the termination device. The "bump" pinches the tension member providing a stronger holding capacity. Moreover, the location of the bump causes a redistribution of the normal force associated with the load side of the termination device to move compressive force to location experiencing less tensile force.

In another embodiment of the termination devices of the invention a lever concept is employed to terminate a tension member where no additional parts such as wedges are necessary. Rather in the lever embodiment, a tension member need merely be inserted into the device and a load placed on the tension member. The load pulls on one end of the device which imposes a compressive force on the tension member in another end of the device. The concept is applicable primarily to low overhead applications but of course could be used for any application.

In yet still another embodiment of the invention, a rotary termination device is disclosed which provides significant frictional surface area to remove tensile stress in a tension member and simultaneously allows a component of the device having the frictional surface area to rotate and provide a clamping or compressive force to a cut end of the tension member against a second component of the device.

BRIEF DESCRIPTION OF THE DRAWINGS

Referring now to the drawings wherein like elements are numbered alike in the several FIGURES:

FIG. 2 is a perspective partially exploded view of a first embodiment of the invention;

FIG. 3 is a elevation view of the first embodiment of the invention;

FIG. 4 is top plan view of the same invention;

FIG. 5 is a partial perspective view of the first embodiment of the invention;

FIG. 6 is a schematic cross section of a second embodiment of the invention;

FIG. 10 is a schematic side view of an sixth embodiment of the invention;

FIG. 11 is an enlarged view of a portion of the embodiment of FIG. 10 found within circumscription line 11—11; and FIG. 12 is a across section view of the invention of FIG. 10 taken along section line 12—12 in FIG. 10.

DETAILED DESCRIPTION OF THE INVENTION

Figure 1A:
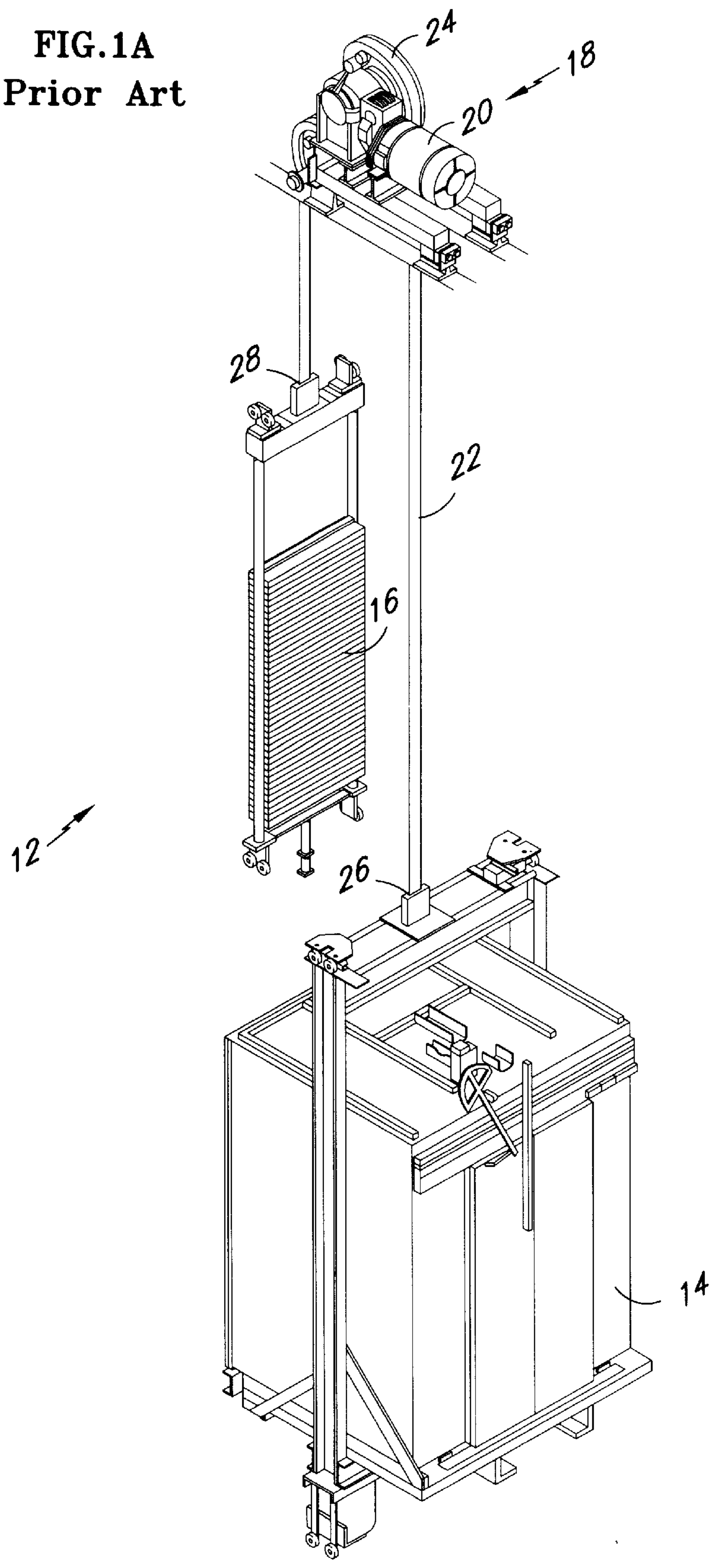
FIG. 1A Prior Art
FIG. 1A is a perspective view of a one-to-one elevator system.
Figure 1B:
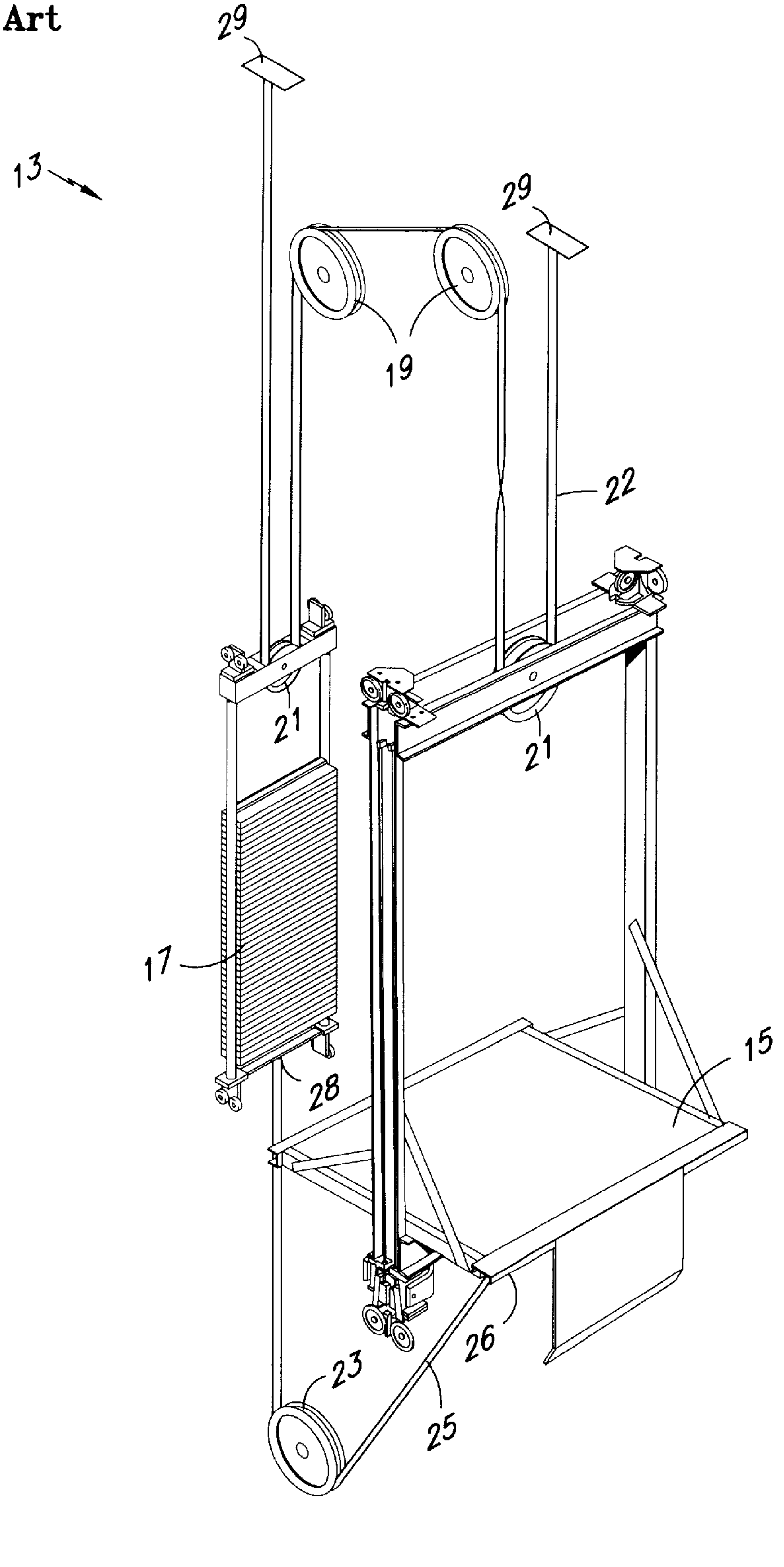
FIG.1B Prior Art
FIG. 1B is a perspective view of a two-to-one elevator system.

Referring to FIG. 1A, the relative location of the tension member termination device of the invention can be ascertained. For clarity, an elevator system 12 is illustrated having car 14, a counterweight 16, a traction drive 18 and a machine 20. The traction drive 18 includes a tension member 22 interconnecting car 14 and counterweight 16 which member is driven by sheave 24. In an alternate configuration, referring to FIG. 1B a two-to-one roping system is illustrated. The general components of such system are a car 15 and counterweight 17 which are interconnected by tension member 22 through idlers 21 and traction sheaves 19. Such systems are generally compensated by compensation line 25 and sheave 23. The tension member of this configuration is connected to dead end hitches at 29. Both ends of tension member 22, i.e., a car end 26 and a counterweight end 28 or, in a 2-to-1 roping embodiment, the two dead end hitches 29 must be terminated. It is either of these termination points for a flexible flat tension member with which the invention is concerned. An exemplary tension member of the type contemplated in this application is discussed in further detail in U.S. Ser. No. 09/031,108 filed Feb. 26, 1998 entitled Tension Member For An Elevator and U.S. Ser. No. 09/218,990 also entitled Tension Member For An Elevator and filed Dec. 22, 1998, both of which are entirely incorporated herein by reference. The elevator system depicted, is provided for exemplary purposes to illustrate the location of the device of the invention.

Referring now to FIG. 2, a perspective partially exploded view of the termination device 30 is illustrated. One of ordinary skill in the art will appreciate the compact size of a socket 32 of the invention. Socket 32 provides support for preferably three pins and a wedge to terminate a tension member. At the top of the drawing, socket 32 provides a pin mount 34 to support a pin 35 and bolt 37 (FIG. 5) which conventionally attaches to a dead hitch 29 (FIG. 1B) or to the car and counterweight of FIG. 1A. Socket 32 further provides a fixed pin mount 36 to support a fixed pin 38 (could be removable) and a removable pin mount 40 to support a removable pin 42. The location of pins 42 and 38 relative to a wedge 44 inserted into socket 32 with a flat tension member 22, control the distribution of the normal pressure on the tension member 22 exerted by wedge 44 against socket 32. This is important to the invention and beneficial to the industry because the total stress in any terminated tension member is the combination of the tensile stress imposed by the load on the tension member 22 and the normal compression stress imposed by a wedge or other clamping device. The tensile stress in the member is highest where the tension member 22 enters the termination device 30. The tensile stress in tension member 22 is lessened as it extends into the termination device because of friction between wedge 44 and socket 32 on a load side 54 (FIG. 3) of the device 30. Thus by the time tension member 22 reaches a rounded portion 46 of wedge 44, much of the tensile stress originally existing in tension member 22 due to a load thereon occasioned by a hanging elevator car or counter weight (not shown) has been removed by friction. By distributing the normal compressive stress away from an entrance 48 to the termination device 30, total member stress can be reduced making re-roping operations less frequent.

Controlling the normal compressive stress on tension member 22 is a function of the size and angle of wedge 44 in combination with the locating pins 38 and 42. A preferred placement according to the invention is one in which compressive stress is reduced where tensile stress is high, shifting higher a compressive force to areas where tensile stress in tension member 22 is less. More specifically, pin 38 should be located to allow wedge 44 to apply a lesser compressive load to the tension member 22 at the opening of socket 32. Pin 42 is placed such that wedge 44 will create a greater compressive load on tension member 22 at a higher location 50 on wedge 44 than near an entrance 48 to socket 32. Pin 38 is positioned to allow wedge 44 in the vicinity of point 52 to move slightly to the left in FIG. 3 to unload (compressive force) tension member 22 at entrance 48 to socket 32. One of ordinary skill in the art will appreciate that the pin location and the angle of wedge 44 work together to create the distribution of compressive load. Moreover and as is visible in FIG. 3, the pattern of the tension member 22 wrapping around the various components of device 30 is also a factor in biasing compressive stress to region 50.

Focusing on FIG. 3, it will be appreciated that tension member 22 enters socket 32 at entrance 48 and is frictionally and compressively secured on load side 54 of socket 32/wedge 44. In this location, the majority of the tensile stress existing in tension member 22 from the load of the elevator car is removed therefrom. Preferably about 50% of the tensile stress in member 22 is removed in this section (assuming a coefficient of friction of about 0.25). Tension member 22 then extends over curved section 46 of wedge 44 where more frictional forces are available but compressive forces are not. Tension member 22 loses about 60% more of the remaining tensile stress in this region. Proceeding down wedge 44 to second flat surface 56, the balance of tensile stress is removed from tension member 22. There is also, as will be noted from the drawing, a compressive force on the tension member in the area of flat surface 56 and an additional "pinching" force from pin 42 and from pin 38. The pinching force additionally helps to lock tension member 22 into termination device 30. It is important to note that the pinching profile provided must be located after the curved section 46 because in this location the tensile force in the rope has been reduced by friction and compression and allows the luxury of a high locally compressed area without risk of breakage. Tension member 22 is wrapped around pin 38 and then passed between pin 42 and wedge 44 to complete the termination. It is important to note that a single width of tension member 22 is deposed between pin 38 and wedge 44 while a double thickness of tension member 22 is disposed between pin 42 and wedge 44. This functions to increase compressive loading of tension member 22 both between pin 42 and wedge 44 and between wedge 44 and socket 32 in region 50. In addition, a security clamp (not shown) can be added at cut end 60 of tension member 22 but is not necessary.

A benefit of the arrangement of the invention is that pin 42 is specifically removable. This is important with respect to disassembly for adjustment or re-roping operations. By removing pin 42, wedge 44 need only be lifted a small amount to relieve termination pressure on tension member 22. Wedge 44 is then easily removed from termination device 30 and the tension member released. Because of the much reduced level of effort and time required to disassemble the device, expense is saved and the art is benefited. Moreover, the termination device 30 itself is less expensive to manufacture due to the simple components thereof.

In a second embodiment of the invention a socket 70 is formed to receive a wedge 72 wherein load side 74 of socket 70 is located relative to dead hitch pin hole 76 to center pin hole 76 over a load side of tension member 22 so that the load (elevator car not shown) will hang from dead hitch (not shown) through pin hole 76 in a centered manner. The device, then, creates no additional stress on tension member 22 due to bending. Tension member holding of the invention is provided by friction and compression on load side 74 of socket 70 and additionally by a pinching feature 78 located on an unloaded side 80 of socket 70.

Load side 74 of socket 70 is preferably of a high coefficient of friction. Texturing to enhance the coefficient of friction on the inside surface of load side 74 for a distance which may be from a small area to an area equivalent to the length of a wedge may be done to increase the natural coefficient of friction of the material of socket 70 if required or desired. Load side 74 functions identically to the foregoing embodiment in all respects.

At the unloaded side 80 of socket 70, wedge 72 bears upon only a “bump” 78 or other raised surface feature which provides a pinching effect on tension member 22 against wedge 72. The bump itself is preferably elongated in the lateral direction so that the peak of the bump entirely traverses tension member 22. Preferably the bump is rounded to provide better holding power on the tension member 22. The placement of bump 78 is also important to the invention since its placement has an effect on the compressive load imposed on the load side 74 of socket 70. By carefully placing bump 78, the compressive load may be shifted to a location on load side 74 that is subject to less tensile stress from the load of an elevator car (not shown). The stress distribution has been discussed hereinbefore and is applicable to this embodiment identically.

Figure 7:
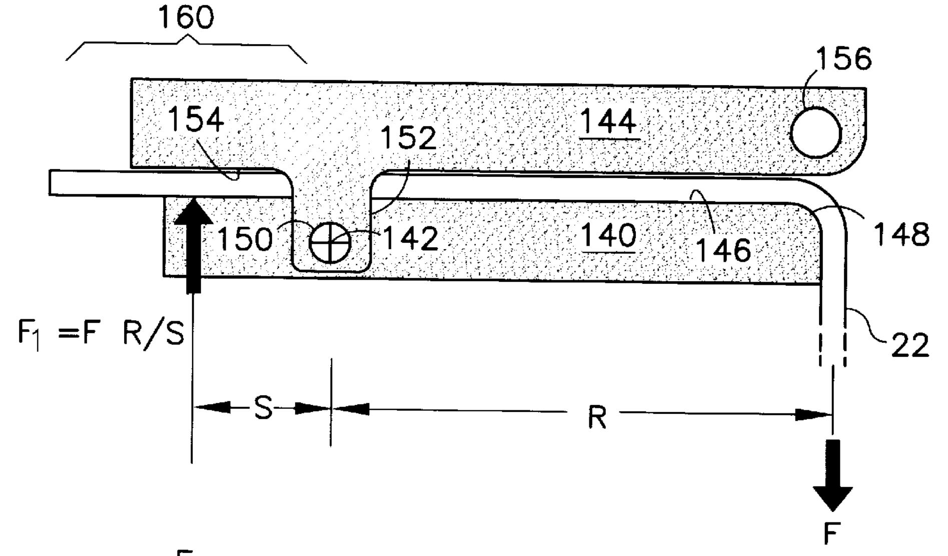
FIG. 7 is a schematic side elevation view of a third embodiment of the invention which employs leverage to apply a compressive force on a tension member.

Referring now to FIG. 7 another termination device of the invention is illustrated. This embodiment applies compressive force to the tension member 22 through a leverage arrangement. Leverage is created, by lower lever 140 through fulcrum 142 to upper lever 144. It is to be understood the terms “lower” end and “upper” are relative and could be reversed without changing the friction of the device.

Lower lever 140 preferably provides a top surface 146 having a radiused load end 148 which radius is preferably selected to meet minimum bend radius requirements for a flat tension member. A pin 150 is provided for fulcrum 142. Preferably sufficient room is provided between a pair of arms 152 extending from lever 144 to receive lever 140 and tension member 22. Arms 152 are also preferably long enough to provide minimally enough space between surface 146 of lever 140 and a lower surface 154 of lever 144 to allow tension member 22 to be invested therebetween. It should also be noted that lever 144 is preferably longer than lever 140 in order to provide material in which pin hole 156 may be bored and be centered above a load direction of tension member 22.

Figure 8:
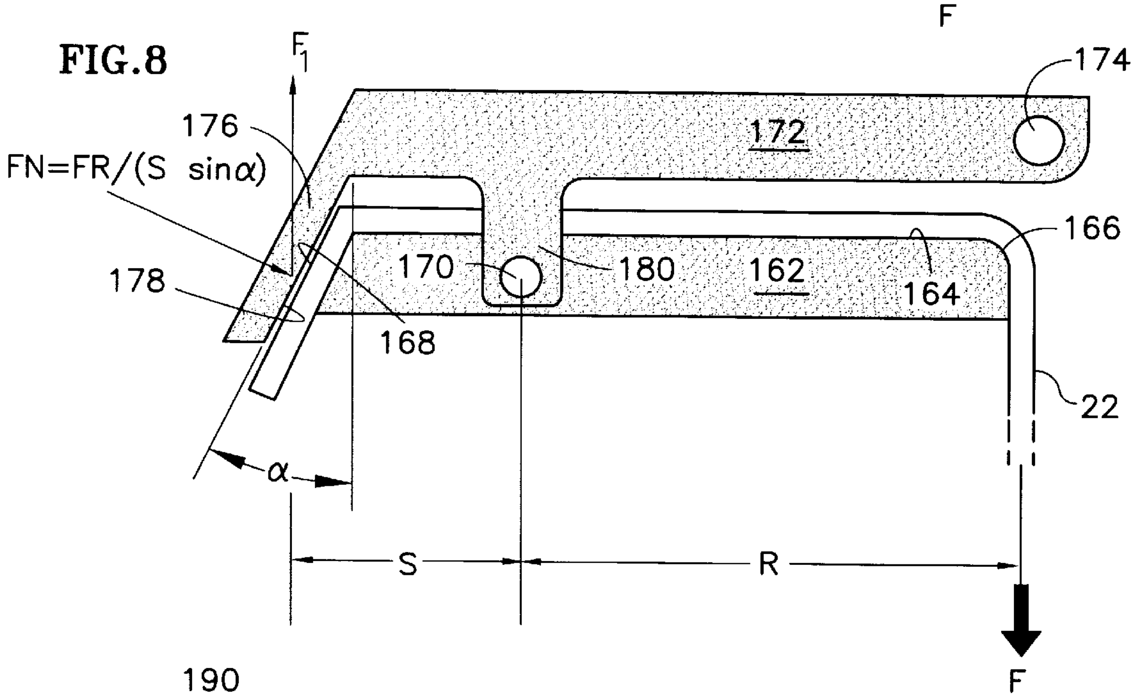
FIG. 8 is a schematic side view of a fourth embodiment similar to the embodiment of FIG. 7 but providing further and enhanced compressive area.

In another embodiment of the invention, referring to FIG. 8, the basic concept remains the same but compressive force generated by the device is enhanced due to the location of the generation of such force. The embodiment includes a lower level 162 having a friction surface 164 with a radius 166 on one edge thereof and an angled surface 168 on another edge thereof. A pivot pin 170 is located in a preselected position relative to the length of lower level 162. The appropriate placement of pin 170 is determined by calculation and is discussed further hereunder. An upper lever 172 is preferably longer than lever 162 on one end thereof to provide material through which pin hole 174 is provided. On an opposite end of lever 172 from pin hole 174 is angled section 176 which is provided with an angled contact surface 178. Contact surface 178 is preferably about parallel with angled surface 168 when the upper and lower levers 162, 172 are in a parallel relationship to one another. Arms 180 (only one visible) are preferably long enough to space lever 172 from lever 162 by an amount sufficient to ensure that compression of the rope occurs between surface 168 and 178 and not between the horizontal surfaces.

In the embodiment, the tension member 22 is threaded through from right to left in the drawing. The load (elevator car not shown) placed on tension member 22 causes the termination device to act by pulling the right side of lever 162 downwardly making the left side of lever 162 impinge on surface 178 of lever 172. The clamping or compressive force on the tension member between surfaces 168 and 178 is dictated by:

$$FN = F\frac{R}{(S\cdot\sin\alpha)}$$

Where F is the load on tension member 22;

R is the distance between a center of load F and pivot point 170;

S is the distance between pivot point 170 and the desired location of clamping force FN, as shown in FIG. 8;

α is the angle between a line normal to lever 172 and surface 178.

Mechanical advantage is increased in this embodiment as can be illustrated by an example. Where the latter embodiment would create a mechanical advantage of 3, the angular surfaces of this embodiment where the angle a =20 degrees provide a mechanical advantage of 8.8. A significant enhancement is therefore realized in this embodiment without adding significant complexity to the device.

Figure 9:
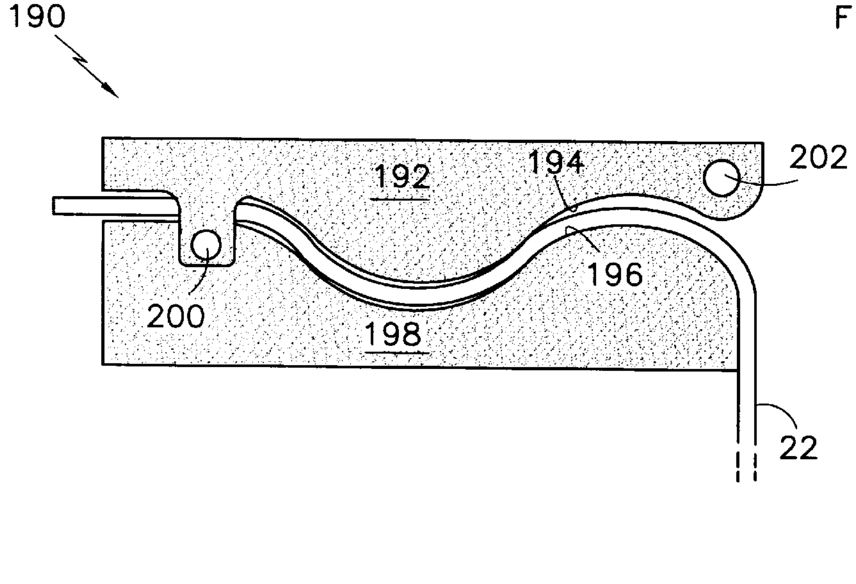
FIG. 9 is a another schematic side view of a fifth embodiment of the invention where friction in the device prior to the leverage point is enhanced.

In yet another similar embodiment of the invention, referring to FIG. 9, the termination device 190 is made shorter than its two proceeding cousins by adding frictional forces through curved contact surfaces. The device does not experience higher loading on the pivot than the embodiments of FIGS. 7 and 8. In this embodiment an upper lever 192 provides a sinuous contact surface 194 on its lower surface which approximates a sinuous contact surface 196 on lower lever 198. The sinuous surfaces provide enhanced frictional characteristics and thus remove tensile stress from tension member 22. By so removing the leverage on a pivot pin 200 in lower lever 198 is not made higher by a shorter overall length of device 190. A pin hole 202 is provided in upper lever 192 to secure device 190 to a dead end hitch (not shown).

Referring now to FIGS. 10–12 another alternative termination device of the invention is illustrated. The device 210 employs a rotary movement with a substantial friction surface 212 on a cam 214 as well as a clamping action on cut end 216 of tension member 22 between cam 214 and socket 218.

Cam 214 is of a complex french curve-type configuration with a hole 222 bored therein to nest with boss 224 of socket 218. The bored hole is preferably off center in cam 214. The location of hole 222 is dictated by maximizing the ratio between r1 and r2. Cam 214 is rotatable about boss 224 which causes cam extension 226 to come into compressive contact with knob 228 of socket 218 (an impingement area). Since cut end 216 of tension member 22 passes between cam extension 226 and knob 228, it is subjected to compressive force when cam 214 is urged to rotate by a load being placed upon tension member 22.

The force retaining tension member 22 is defined as F2. F2=K fric X Fnorm $$\text{Where } Fnorm = F1 \times \frac{(R1/R2)}{\text{Tan}a}$$

R1 and R2 are distances as depicted in FIG. 10 and angle a is the angle between the knob surface and the trajectory of the motion of the cam extension 226 in the point of contact when cam is rotating about boss 224.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An elevator car tension member termination device comprising:

a socket having an entrance through which a tension member can extend and a load side on which is formed a friction surface, said friction surface having a region remote from the entrance of the socket;

a wedge associable with said socket with a length of the tension member between said wedge and the load side of said socket; and a wedge position controller biasing said wedge, when said wedge is associated with said socket and when tension is applied to the tension member, to compress the tension member between said wedge and the load side of said socket with a force distribution in which greater compressive forces are applied at the remote region of the friction surface than at a region proximate the entrance of said socket.

2. The elevator car tension member termination device as claimed in claim 1 wherein said friction surface extends for a distance along the load side of the socket equivalent to a distance of said wedge that provides compressive force.

3. The elevator car tension member termination device as claimed in claim 2 wherein said friction surface has a coefficient of friction of 1.0.

4. The elevator car tension member termination device as claimed in claim 1 wherein said wedge position controller biases said wedge to cause said force distribution.

5. The elevator car tension member termination device as claimed in claim 1 wherein said wedge position controller is a pin mounted to said socket.

6. The elevator car tension member termination device as claimed in claim 5 wherein said pin is removable.

7. The elevator car tension member termination device as claimed in claim 1 wherein said wedge position controller is a "bump" in said socket positioned to contact said wedge at a location calculated to facilitate said force distribution.

8. The elevator car tension member termination device as claimed in claim 5 wherein said pin pinches a separate section of the tension member when threaded through said termination device.

9. The elevator car tension member termination device as claimed in claim 7 wherein said bump pinches a separate section of the tension member when threaded through said termination device.

10. The elevator car tension member termination device as claimed in claim 1 wherein said wedge has a standard wedge shape including a curved wide end and two divergent surfaces.

11. An elevator car tension member termination device comprising:

a socket having a load side on which is formed a friction surface; and a wedge associable with said socket with a section of a length of a tension member between said wedge and the load side of said socket, one of said wedge and said socket being shaped to generate a compressive load in the section of the tension member when tension is applied to the length of the tension member, wherein the compressive load is distributed unevenly over the friction surface.

12. The elevator car tension member termination device as claimed in claim 11 wherein the compressive load is concentrated away from an entrance to the socket through which the length of the tension member extends.

13. An elevator car tension member termination device comprising:

a socket having at least a load side friction surface; and a wedge receivable in said socket, said wedge and said socket cooperating to provide a frictional force and a compressive force to a tension member that is threaded between said wedge and said socket when tension is applied to a length of the tension member, the compressive force being distributed in said socket to concentrate the compressive force away from an entrance of said socket through which the length of the tension member extends.

* * * * *